(12) United States Patent
Cantor

(10) Patent No.: US 12,153,730 B2
(45) Date of Patent: Nov. 26, 2024

(54) COMBINED GAZE-BASED AND SCANNING-BASED CONTROL OF AN APPARATUS

(71) Applicant: Tobii Dynavox AB, Stockholm (SE)

(72) Inventor: Jaén Cantor, Danderyd (SE)

(73) Assignee: Tobii Dynavox AB, Stockholm (SE)

( * ) Notice: Subject to any disclaimer, the term of this patent is extended or adjusted under 35 U.S.C. 154(b) by 0 days.

(21) Appl. No.: 16/794,136

(22) Filed: Feb. 18, 2020

(65) Prior Publication Data
US 2020/0387220 A1 Dec. 10, 2020

(30) Foreign Application Priority Data
Feb. 18, 2019 (SE) .................................. 1950205-3

(51) Int. Cl.
| | |
|---|---|
| *G06F 3/01* | (2006.01) |
| *G06F 3/04842* | (2022.01) |
| *G06F 3/16* | (2006.01) |
| *G06V 40/19* | (2022.01) |

(52) U.S. Cl.
CPC .......... *G06F 3/013* (2013.01); *G06F 3/04842* (2013.01); *G06F 3/167* (2013.01); *G06V 40/19* (2022.01)

(58) Field of Classification Search
CPC ...... G06F 3/013; G06F 3/167; G06F 3/04842; G06K 9/00604
See application file for complete search history.

(56) References Cited

U.S. PATENT DOCUMENTS

| | | | |
|---|---|---|---|
| 2013/0147687 A1* | 6/2013 | Small | G02B 27/017 345/8 |
| 2017/0172675 A1* | 6/2017 | Jarc | G16H 20/40 |
| 2017/0212583 A1* | 7/2017 | Krasadakis | G06F 3/0482 |
| 2019/0155495 A1* | 5/2019 | Klein | G06F 9/451 |
| 2019/0362557 A1* | 11/2019 | Lacey | G06F 3/167 |
| 2020/0049946 A1* | 2/2020 | Peuhkurinen | G02B 7/287 |
| 2020/0142479 A1* | 5/2020 | Aleem | G02B 27/0093 |
| 2020/0353868 A1* | 11/2020 | Schut | B60R 1/04 |

* cited by examiner

*Primary Examiner* — Sahlu Okebato
(74) *Attorney, Agent, or Firm* — The Webb Law Firm (57) ABSTRACT

The present disclosure generally relates to interaction between a user and an apparatus, sometimes referred to as user-apparatus interaction or human-computer interaction. More specifically, the present disclosure generally relates to combined gaze-based and scanning-based control of an apparatus, such as a computer, a tablet computer, or a desktop computer. In more detail, the present disclosure presents methods, apparatuses, computer programs and carriers, which combine gaze-based control with scanning-based control for controlling the apparatus.

17 Claims, 9 Drawing Sheets

COMBINED GAZE-BASED AND SCANNING-BASED CONTROL OF AN APPARATUS

CROSS-REFERENCES TO RELATED APPLICATIONS

This application claims priority to Swedish Application No. 1950205-3, filed Feb. 18, 2019; the content of which are hereby incorporated by reference.

TECHNICAL FIELD

The present disclosure generally relates to interaction between a user and an apparatus, sometimes referred to as user-apparatus interaction or human-computer interaction. More specifically, the present disclosure generally relates to combined gaze-based and scanning-based control of an apparatus, such as a computer, a tablet computer, or a desktop computer. In more detail, the present disclosure presents methods, apparatuses, computer programs and carriers, which combine gaze-based control with scanning-based control for controlling the apparatus.

BACKGROUND

User-apparatus interaction generally relates to the input of information to and control of an apparatus (e.g. a computer, a tablet computer, a desktop computer, a handheld device such as a mobile telephone or similar) by a user. Many popular computer programs and operating systems have been developed to function primarily with input methods involving physical contact (e.g., by means of a mouse or key board). This type of physical input method is sometimes referred to as contact-required input method. It can be difficult for people who desire to use non-contact input methods to interact with these computer programs and operating systems. For example, some users must use non-contact input methods (e.g., because of an injury or disability).

As computer technology has evolved, non-contact input methods have been developed. An example of a non-contact input device allowing for non-contact input is described in the U.S. Pat. No. 7,572,008. This United States Patent describes an eye-tracking device developed by Tobii AB, Sweden. Eye-tracking devices may operate on the principle of illuminating an eye of a user with infrared light and utilizing an image sensor to detect reflection of the light off the eye. A processor may use the data from the image sensor to calculate, or otherwise determine, the direction of the user's gaze. Non-contact input methods utilizing a point of a user's gaze are sometimes referred to as gazed-based control methods. Gaze-based control methods are generally used, or preferred, by users who have good vision.

As the technology has progressed, alternative non-contact input methods have also been developed. One alternative non-contact input method is commonly known as scanning-based control methods. Scanning is briefly mentioned and discussed in the International PCT Patent Application published under WO 2010/141403 A1 (see e.g. paragraphs [00233]-[00234]). Scanning is a method that is generally used, or preferred, by users that have comparatively lower or even poor vision (as compared with the user's using or preferring gaze-based control methods).

Many existing non-contact input methods still require some limited physical user-apparatus interaction. For example, some existing non-contact input methods may require a user to confirm a user-initiated action, e.g. a user-initiated selection, during his or her interaction with the apparatus.

SUMMARY

It is in view of the above considerations and others that the various embodiments disclosed throughout this disclosure have been made.

The inventor of the present patent application has realized that there is a need to improve upon existing methods and apparatuses for controlling an apparatus. For example, some existing solutions are inadequate in that they still require relatively many physical interactions between the user and the apparatus. For user's that require good ergonomics, e.g. people with disabilities, the more physical user-apparatus interaction that is required the more the ergonomics can be impaired. For example, some users may experience fatigue in arms or hands when interacting with a non-contact input method that requires unnecessarily much physical user-apparatus interaction (e.g., for confirming user-initiated actions such as user-initiated selections by the use of a mouse). Furthermore, the inventor of the present patent application has realized that it would be advantageous to allow for improving the speed in operating the apparatus during the user-apparatus interaction.

In view of the above, it is therefore a general object of the embodiments of the present invention to improve upon existing methods and apparatuses for controlling an apparatus.

This general object has been addressed by the appended independent claims. Advantageous embodiments are defined in the appended dependent claims.

In general terms, the present disclosure proposes to combine gaze-based control with scanning-based control for controlling an apparatus.

According to a first aspect, a method of controlling an apparatus having a display is provided. The method combines gaze-based control with scanning-based control for controlling the apparatus.

An input representing a point of a user's gaze is received from an eye-tracking device. Furthermore, a gaze target location is identified on the display based on the received input. A zone of the display is selected, or otherwise chosen, based on the identified gaze target location. In response thereto, scanning control is performed within the selected zone.

Advantageously, the display may be divided into multiple zones. Performing the scanning control may advantageously comprise performing the scanning control only within the selected zone.

In some embodiments, the method may further comprise performing scanning control prior to receiving the input representing said point of a user's gaze and the input representing said point of a user's gaze may be received during the scanning control.

In some embodiments, identifying the gaze target location may further include outputting auditory feedback to guide a user in the user's interaction process with the apparatus.

In some embodiments, identifying the gaze target location may further include detecting a confirmation signal. In one embodiment, detecting the confirmation signal may comprise detecting a gaze target fixating at the gaze target location for a predetermined length of time. Additionally, or alternatively, detecting the confirmation signal may comprise detecting a blink based on information provided by the eye-tracking device. Additionally, or alternatively, detecting the confirmation signal may comprise detecting a saccade based on information provided by the eye-tracking device. Additionally, or alternatively, detecting the confirmation signal may comprise detecting a contact-required input provided by a physical input device. Additionally, or alternatively, detecting the confirmation signal may comprise detecting an audio input provided by an audio sensing device.

In some embodiments, selecting the zone of the display is performed only in response to detecting the confirmation signal.

In some embodiments, the method comprises presenting a graphical representation of the multiple zones on the display to guide a user in the user's interaction process with the apparatus by making selectable zones viewable on the display.

According to a second aspect, an apparatus configured to combine gaze-based control with scanning-based control for controlling the apparatus is provided.

The apparatus may comprise an eye-tracking device, a display, one or more processors, and one or more memory/-ies.

The memory/-ies may comprise instructions executable by the processor(s) whereby the apparatus is operative to: receive, from the eye-tracking device, an input representing a point of a user's gaze; identify a gaze target location on the display based on the received input; select a zone of the display based on the identified gaze target location; and in response thereto perform scanning control within the selected zone.

In advantageous embodiments, the display is divided into multiple zones. The memory/-ies may comprise instructions executable by the processor(s) whereby the apparatus is operative to perform the scanning control only within the selected zone.

In some embodiments, the memory/-ies comprise(s) instructions executable by the processor(s) whereby the apparatus is operative to perform scanning control prior to receiving an input representing said point of a user's gaze and wherein the input representing said point of a user's gaze is received during the scanning control.

In some embodiments, the memory/-ies comprise(s) instructions executable by the processor(s) whereby the apparatus is operative to output auditory feedback via an audio output device to guide a user in the user's interaction process with the apparatus.

In some embodiments, the memory/-ies comprise(s) instructions executable by the processor(s) whereby the apparatus is operative to detect a confirmation signal. In one embodiment, the memory/-ies may comprise instructions executable by the processor(s) whereby the apparatus is operative to detect a gaze target fixating at the gaze target location for a predetermined length of time. Additionally, or alternatively, the memory/-ies may comprise instructions executable by the processor(s) whereby the apparatus is operative to detect a blink based on information provided by the eye-tracking device. Additionally, or alternatively, the memory/-ies may comprise instructions executable by the processor whereby the apparatus is operative to detect a saccade based on information provided by the eye-tracking device.

In some embodiments, the apparatus may additionally comprise a physical input device. The memory/-ies may comprise instructions executable by the processor(s) whereby the apparatus is operative to detect a contact-required input provided by the physical input device.

In some embodiments, the memory/-ies may comprise instructions executable by the processor(s) whereby the apparatus is operative to detecting an audio input provided by an audio sensing device.

In some embodiments, the memory/-ies may comprise instructions executable by the processor(s) whereby the apparatus is operative to select the zone of the display only in response to detecting the confirmation signal.

In some embodiments, the memory comprises instructions executable by the processor(s) whereby the apparatus is operative to present a graphical representation of the multiple zones on the display to guide a user in the user's interaction process with the apparatus by making selectable zones viewable on the display.

As will be appreciated, the apparatus may be embodied as an electronic apparatus.

The apparatus may be an apparatus selected from the group consisting of: a computer (e.g. a Personal Computer (PC)), a tablet computer, and a desktop computer.

Alternatively, the apparatus may be a mobile telephone, a cellular phone, a smart phone or any other handheld electronic device.

According to a third aspect, a computer program is provided. The computer program comprises instructions which, when executed on at least one processor, cause the at least one processor to carry out the method according to the first aspect described herein.

A carrier containing the computer program according to the third aspect is also provided. The carrier may be one of an electronic signal, optical signal, radio signal, or computer readable storage medium.

Various embodiments described herein allow for an improvement upon existing methods and apparatuses for controlling an apparatus. An important contribution to the existing art by the various embodiments described herein is based on the realization by the inventor that it is advantageous to combine gaze-based control with scanning-based control for controlling an apparatus. In the existing art, these two control methods have always been used as separate input methods. By combining gaze-based control with scanning-based control for controlling an apparatus, some embodiments may allow for reducing the number of physical interactions between the user and the apparatus. This, in turn, may improve the overall speed in operating the apparatus during the user-apparatus interaction. Furthermore, the fewer the number of the physical interactions are the better can the ergonomics be. This may be particularly important to some users, e.g. users having disabilities. This can reduce these users' fatigue in arms and hand during their interaction with the apparatus.

BRIEF DESCRIPTION OF DRAWINGS

These and other aspects, features and advantages will be apparent and elucidated from the following description of various embodiments, reference being made to the accompanying drawings, in which.

DETAILED DESCRIPTION

The present invention will now be described more fully hereinafter. The invention may, however, be embodied in many different forms and should not be construed as limited to the embodiments set forth herein; rather, these embodiments are provided by way of example so that this disclosure will be thorough and complete, and will fully convey the scope of the invention to those users skilled in the art. Like reference numbers refer to like elements or method steps throughout the description.

As described earlier, some existing solutions for controlling an apparatus during the user-apparatus interaction may be inadequate. For example, existing solutions for controlling an apparatus may be perceived as requiring unnecessarily many physical interactions. This may be perceived as impairing the ergonomics during the user-apparatus interaction, at least by some users such as users having disabilities.

It is therefore a general object of embodiments described herein to allow for an improved method and apparatus for controlling the apparatus.

To address this, the present disclosure proposes—in general terms—to combine gaze-based control with scanning-based control for controlling an apparatus. In accordance with one embodiment, a method of controlling an apparatus having a display is proposed. Advantageously, the display may be divided into multiple zones, e.g. 2, 3, 4, 6, 8, 12, 16, or 24 zones to mention only a few examples. The method combines gaze-based control with scanning-based control for controlling the apparatus. An input representing a point of a user's gaze may be received from an eye-tracking device. Furthermore, a gaze target location may be identified on the display based on the received input. One zone of the display may be selected, or otherwise chosen, based on the identified gaze target location. In response thereto, scanning control may be performed within the selected zone. The scanning control may advantageously be performed only (i.e., exclusively) within the selected zone.

In contrast to the existing art to date, where gaze-based control and scanning based input methods have always been used as separate input methods the present disclosure suggests combined gaze-based and scanning-based control for controlling an apparatus. As described herein, this may allow for various advantageous effects. For example, the overall speed in operating the apparatus during the user-apparatus interaction can be improved. In addition, the ergonomics may be improved.

Figure 1:
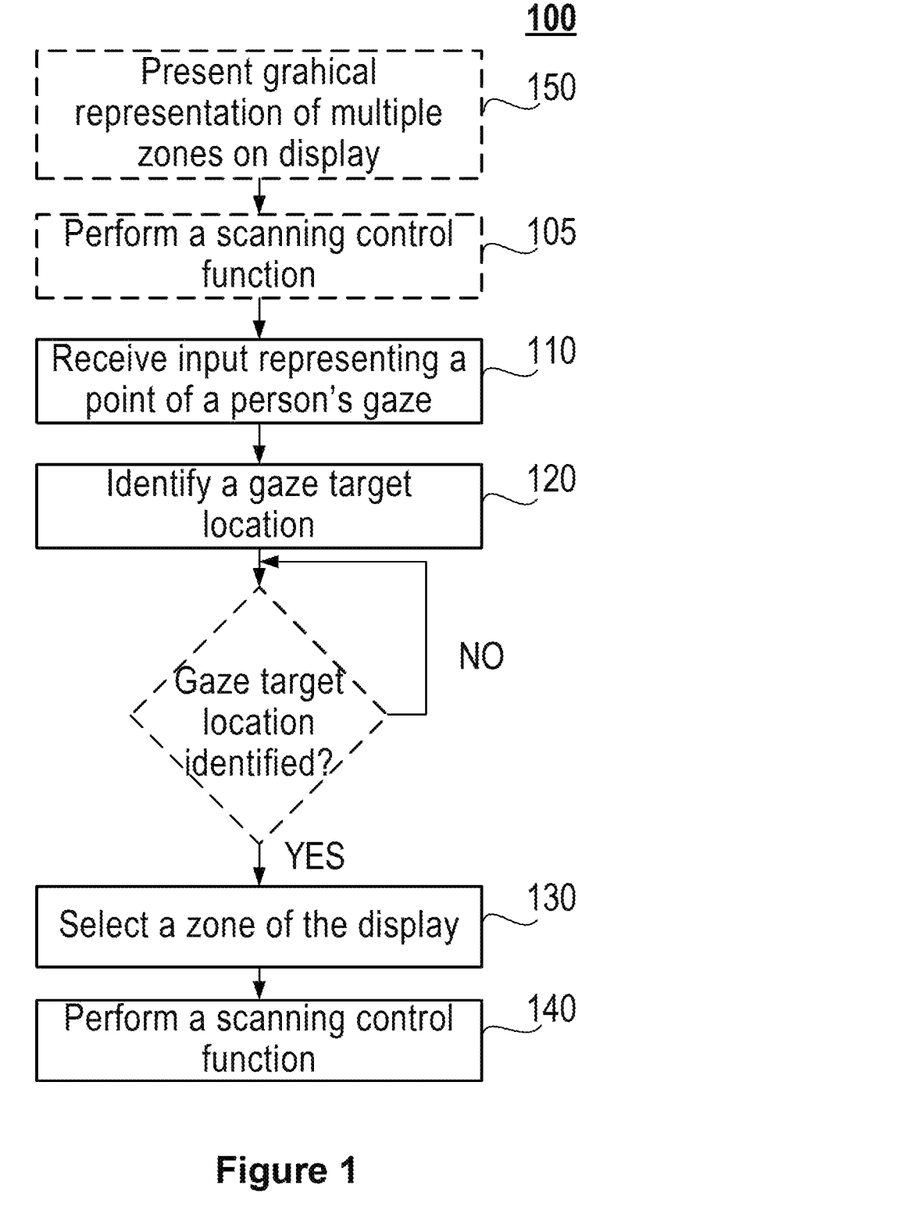
FIG. 1 illustrates a flowchart of a method according to an embodiment.

Turning now to the figures, various embodiments of the invention will be described in further detail. FIG. 1. illustrates a flowchart of a method of controlling an apparatus according to an embodiment. Typically, the apparatus comprises a display. Furthermore, the apparatus may be embodied as an electronic apparatus. For example, the apparatus may be an apparatus selected from the group consisting of: a computer (e.g. a Personal Computer (PC)), a tablet computer, and a desktop computer. Alternatively, the apparatus may be a mobile telephone, a cellular phone, a smart phone or any other handheld electronic device.

The method described in conjunction with FIG. 1 combines gaze-based control with scanning-based control for controlling the apparatus.

As can be seen in FIG. 1, an input representing a point of a user's gaze is received 110. Typically, but not necessarily, the input representing the point of a user's gaze is received 110 by means of an eye-tracking device. Subsequently, a gaze target location can be identified 120, or otherwise localized, on the display based on the received input.

Figure 2:
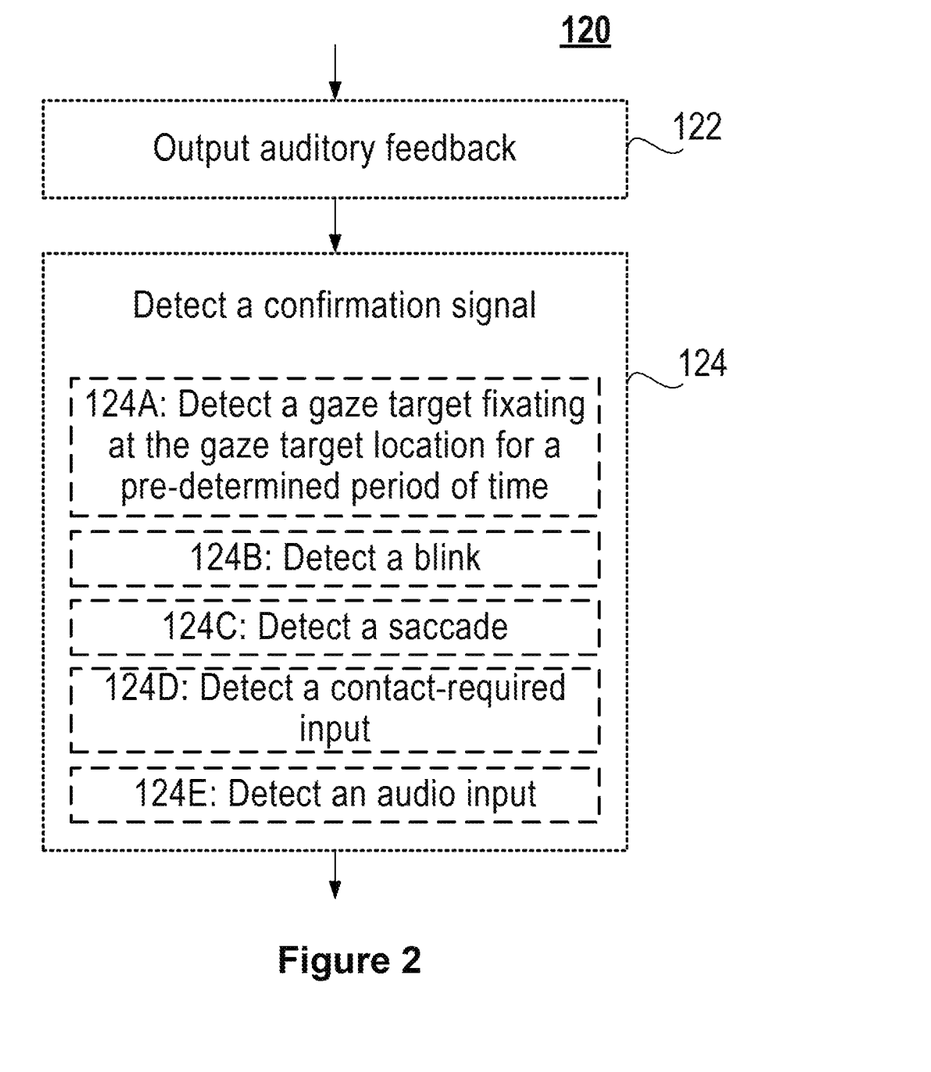
FIG. 2 illustrates a flowchart of an optional method according to an embodiment.

Reference is now made to FIG. 2, which illustrates optional additional actions, or method steps, with respect to identifying 120 the gaze target location. For example, identifying 120 the gaze target location may optionally include outputting 122 auditory feedback to guide a user in the user's interaction process with the apparatus. Additionally, or alternatively, identifying 120 the gaze target location may optionally include detecting 124 a confirmation signal. In some embodiments, detecting 124 the confirmation signal may comprise detecting 124A a gaze target fixating at the gaze target location for a predetermined length of time. Additionally, or alternatively, detecting 124 the confirmation signal may comprise detecting 124B a blink based on information provided by the eye-tracking device. Additionally, or alternatively, detecting 124 the confirmation signal may comprise detecting 124C a saccade based on information provided by the eye-tracking device. Additionally, or alternatively, detecting 124 the confirmation signal may comprise detecting 124D a contact-required input provided by a physical input device. Additionally, or alternatively, detecting 124 the confirmation signal may comprise detecting 124E an audio input provided by an audio sensing device.

Reference is now made to FIG. 1 again. Once a gaze target location has been identified ('Yes' in FIG. 1), a zone of the display can be selected 130, or otherwise chosen, based on the identified gaze target location. In response thereto, scanning control can be performed 140, or otherwise undertaken, within the selected zone. Advantageously, the display of the apparatus can be divided into multiple zones. As will be appreciated, the exact number of zones may vary e.g. depending on system requirements, user demands, and/or other factors. As will be appreciated, the earlier-mentioned scanning control may comprise performing 140 the scanning control only within the zone that has been selected 130.

In some embodiments, the method may optionally also comprise performing 105 scanning control prior to receiving 110 the input representing said point of a user's gaze. In such embodiments, the input representing said point of a user's gaze is received 110 during the performance 105 of this scanning control.

In some embodiments, selecting 130 the zone of the display is performed only in response to detecting 124 the confirmation signal, as described with reference to FIG. 2.

Optionally, the method may additionally comprise presenting 150 a graphical representation of the multiple zones on the display to guide a user in the user's interaction process with the apparatus by making selectable zones viewable on the display. This will be further explained with reference to FIGS. 5A-5D.

Figure 3:
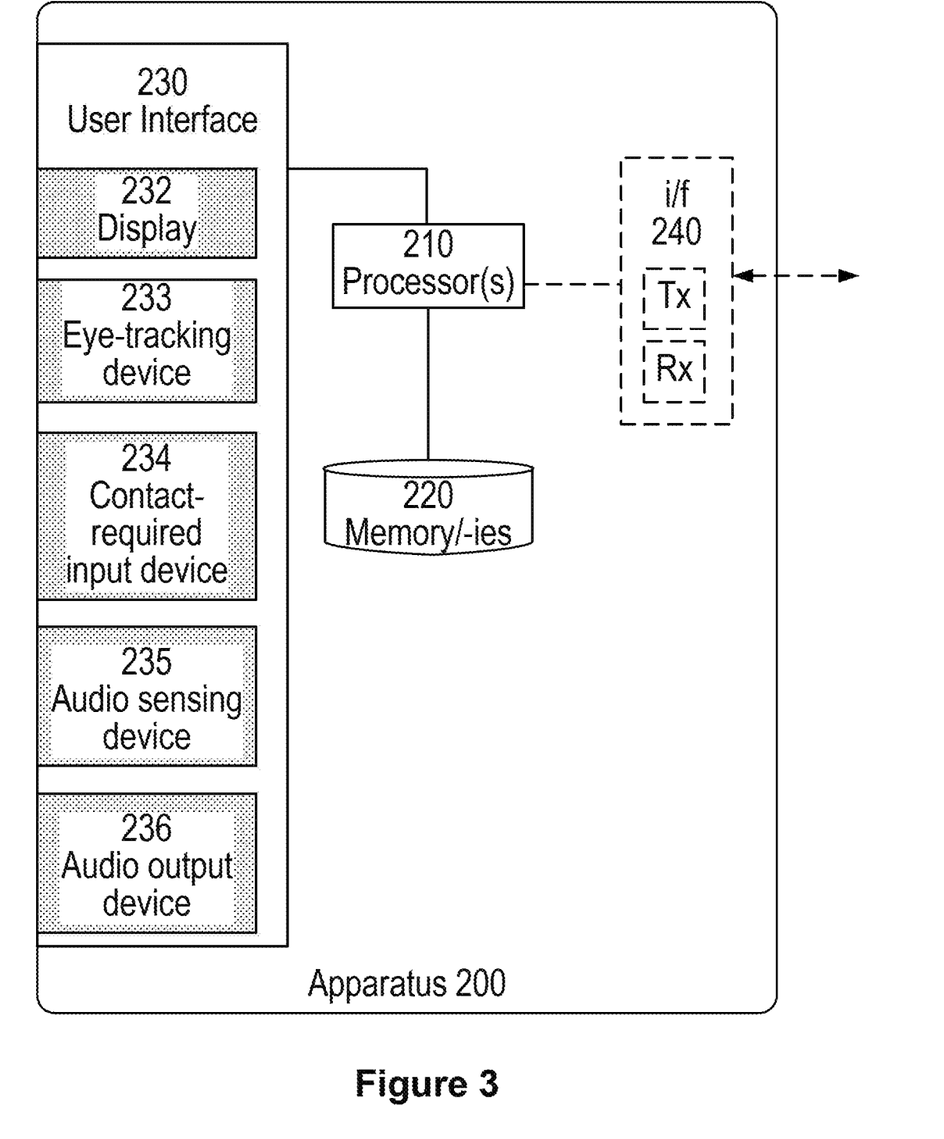
FIG. 3 illustrates an example implementation of an apparatus according to an embodiment.

Reference is now made to FIG. 3, which illustrates an example implementation of an embodiment of an apparatus 200. As mentioned earlier, the apparatus 200 may be embodied as an electronic apparatus, a computer (e.g. a Personal Computer (PC)), a tablet computer, a desktop computer, a mobile telephone, a cellular phone, a smart phone or a handheld electronic device.

The apparatus 200 is configured to combine gaze-based control with scanning-based control for controlling the apparatus 200. As can be seen in FIG. 3, the apparatus 200 comprises one or more processor(s) 210 and one or more memories 220. Typically, the apparatus 200 may also comprise a user interface (UI). The UI may include one or more of the following: a display 232, an eye-tracking device 233, a contact-required input device 234 (e.g. a physical input device), an audio sensing device 235, an audio output device 236. Also, a communications interface 240 may be provided in order to allow the apparatus 200 to communicate with other apparatuses and/or servers (not shown), e.g. via a network such as the Internet. To this end, the communications interface 240 may comprise a transmitter (Tx) and a receiver (Rx). Alternatively, the communications interface 240 may comprise a transceiver (Tx/Rx) combining both transmission and reception capabilities. The communications interface 240 may include a radio frequency (RF) interface allowing the apparatus 200 to communicate with other apparatuses and/or servers through a radio frequency band through the use of different radio frequency technologies such as 5G New Radio (5G NR), LTE (Long Term Evolution), WCDMA (Wideband Code Division Multiple Access), any other cellular network standardized by the 3rd Generation Partnership Project (3GPP), or any other wireless technology such as Wi-Fi, Bluetooth®, etcetera.

The memory/-ies 220 comprises instructions executable by the processor(s) 210 whereby the apparatus 200 is operative to: receive, from the eye-tracking device 233, an input representing a point of a user's gaze; identify a gaze target location on the display 232 based on the received input; select a zone of the display based on the identified gaze target location; and in response thereto perform scanning control within the selected zone.

The earlier-mentioned display 232 may advantageously be divided into multiple zones (e.g., 232A; 232B; 232C; 232D (see FIGS. 5A-5C)). Accordingly, the memory/-ies 220 may comprise instructions executable by the processor 210 whereby the apparatus 200 is operative to perform the scanning control only within the selected zone.

In some embodiments, the memory/-ies 220 may comprise instructions executable by the processor 210 whereby the apparatus 200 is operative to perform scanning control prior to receiving an input representing said point of a user's gaze and wherein this input representing said point of a user's gaze is received during the scanning control.

In some embodiments, the memory/-ies 220 may comprise instructions executable by the processor 210 whereby the apparatus 200 is operative to output auditory feedback 122 via an audio output device 236 to guide a user in the user's interaction process with the apparatus 200.

In some embodiments, the memory/-ies 220 may comprise instructions executable by the processor 210 whereby the apparatus 200 is operative to detect a confirmation signal. In some embodiments, the memory/-ies 220 may comprise instructions executable by the processor 210 whereby the apparatus 200 is operative to detect a gaze target fixating at the gaze target location for a predetermined length of time. In some embodiments, the memory/-ies 220 may comprise instructions executable by the processor 210 whereby the apparatus 200 is operative to detect a blink based on information provided by the eye-tracking device 233. In some embodiments, the memory/-ies 220 may comprise instructions executable by the processor 210 whereby the apparatus 200 is operative to detect a saccade based on information provided by the eye-tracking device 233.

In some embodiments, the contact-required input device 234 is embodied as a physical input device. The memory/-ies 220 may comprise instructions executable by the processor 210 whereby the apparatus 200 is operative to detect a contact-required input provided by the physical input device 234.

In some embodiments, the memory 220 may comprise instructions executable by the processor 210 whereby the apparatus 200 is operative to detect an audio input provided by an audio sensing device 235.

In some embodiments, the memory 220 may comprise instructions executable by the processor 210 whereby the apparatus 200 is operative to select the zone of the display 232 only in response to detecting the confirmation signal.

In some embodiments, the memory 220 may comprise instructions executable by the processor 210 whereby the apparatus 200 is operative to present a graphical representation of the multiple zones (e.g., 232A; 232B; 232C; 232D (see FIGS. 5A-5D)) on the display 232 to guide a user in the user's interaction process with the apparatus 200 by making selectable zones (e.g., 232A; 232B; 232C; 232D (see FIGS. 5A-5D)) viewable on the display 232.

Figure 4:
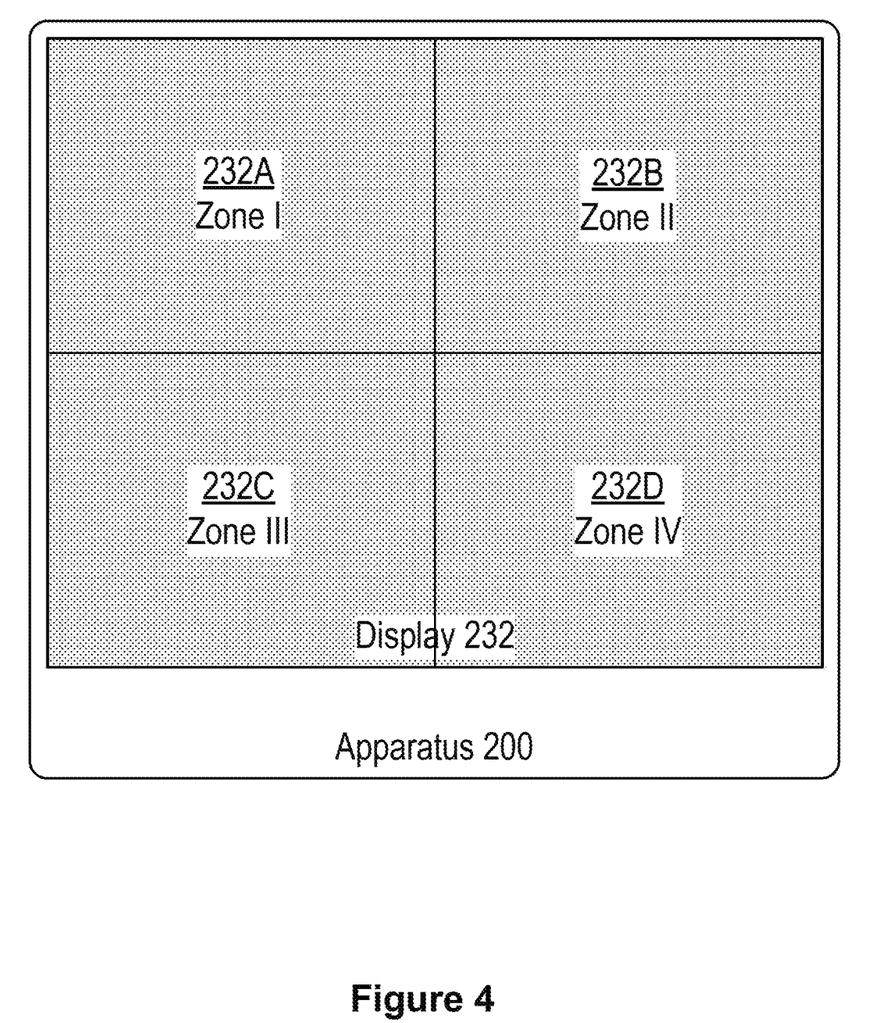
FIG. 4 illustrates an exemplary embodiment of a display divided into multiple zones.

Reference is now made to FIG. 4 together with FIGS. 5A-5D. FIG. 4 schematically illustrates a possible example of a visual appearance of the display 232 of an apparatus 200 shown in FIG. 3, here exemplified by a tablet computer. FIGS. 5A-5D illustrates an example of a user-apparatus interaction sequence when a user (typically a person) interacts with the apparatus 200 shown in FIG. 4.

As is shown in FIG. 4, the display 232 may advantageously be divided into multiple zones, i.e. two or more zones. In this example, the display 232 is divided into four zones, i.e. 232A (Zone I), 232B (Zone II), 232C (Zone III), and 232D (Zone IV). It should be appreciated that other numbers of zones are equally possible. That is, the display 232 may be divided into any number of multiple zones (e.g., 2, 3, 4, 5, 6, 7, 8, 9, 10, 12, 16, or 24 zones to name only a few examples). Preferably, but not necessarily, the apparatus 200 is operative to present a graphical representation of the multiple zones on the display 232. This is advantageous as this may guide a user in the user's interaction process with the apparatus 200 by making selectable zones viewable on the display 232.

Reference is now made to the user-apparatus interaction sequence shown in FIGS. 5A-5D. In accordance with an embodiment, a user (i.e., typically a person) may watch the display 232. An eye-tracking device (not shown) may be configured to receive input representing the user's gaze while the user is watching the display 232. For example, the eye-tracking device (not shown) may be configured to recognize the direction of the user's gaze as it is being moved, e.g. from left to right in the example shown in FIG. 5A.

Figure 5A:
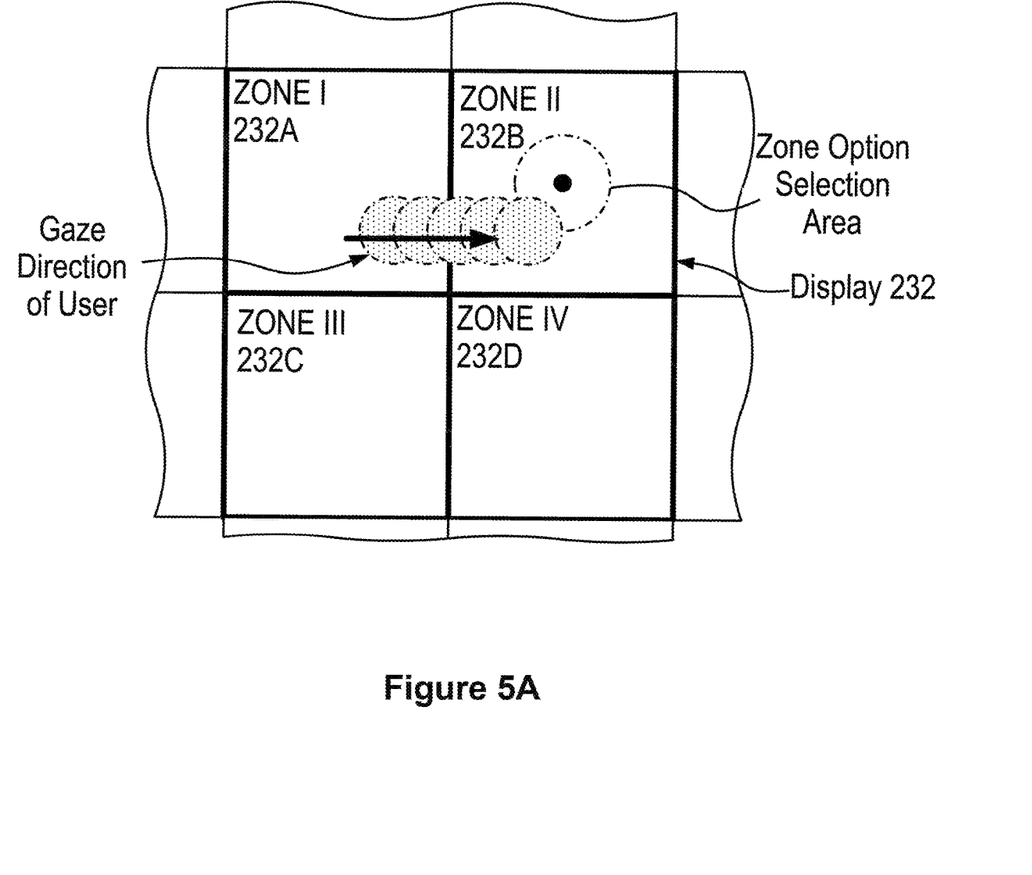
FIGS. 5A-5D illustrates an example of a user-apparatus interaction sequence.

In some embodiments, each one of the multiple zones 232A (Zone I), 232B (Zone II), 232C (Zone III), and 232D (Zone IV) may be provided with a respective 'Zone Option Selection Area'. A gaze target location may be identified based on the received input from the eye-tracking device. Furthermore, a certain zone may be selected based on the identified gaze target location. For instance, if a gaze target location is detected at the 'Zone Option Selection Area' of one of the multiple zones (here exemplified by the zone denoted 232B (Zone II)), this zone is selected.

Figure 5B:
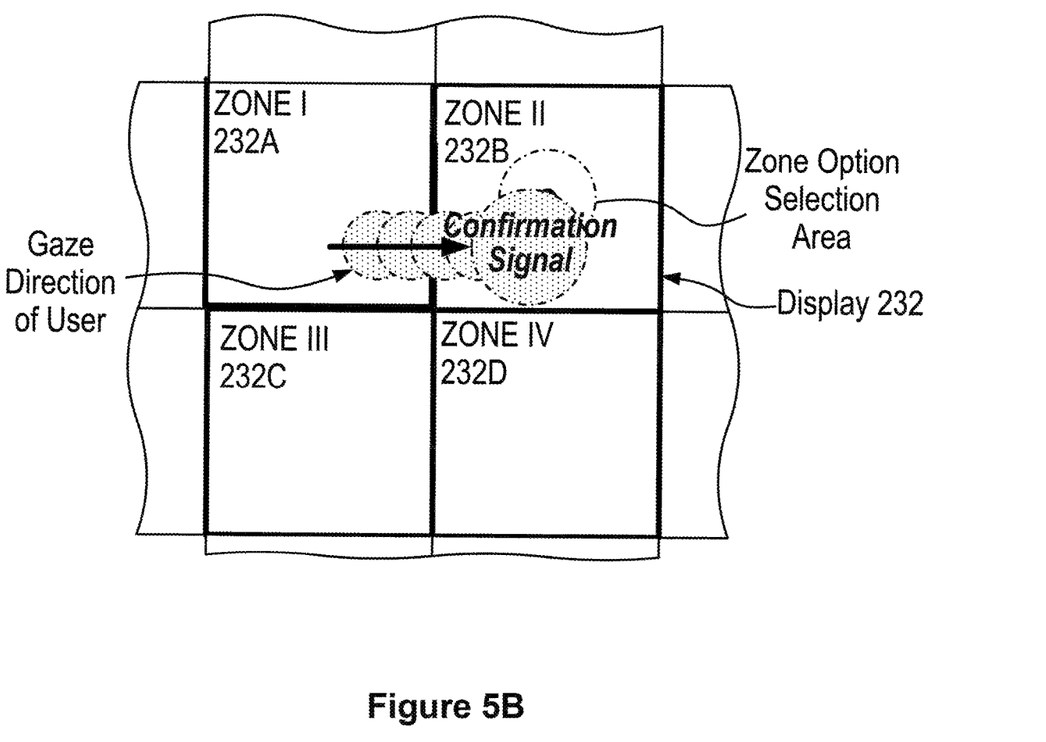

Turning now to FIG. 5B, it will be appreciated that the zone selection may be dependent on a confirmation signal. In other words, the apparatus 200 may be operative to perform selection of the zone (e.g., Zone II 232B in this example) of the display 232 only in response to the apparatus detecting, or otherwise receiving, the confirmation signal.

As described earlier, there exist various ways of detecting a confirmation signal:

In some implementations, detecting the confirmation signal comprises detecting a gaze target fixating at the gaze target location, e.g. at the 'Zone Option Selection Area', for a predetermined length of time. The predetermined length of time may, for instance, be 1-5 seconds. In some implementations, detecting the confirmation signal comprises detecting a blink based on information provided by the eye-tracking device. In some implementations, detecting the confirmation signal comprises detecting a saccade based on information provided by the eye-tracking device. The above-mentioned implementations are advantageous in non-contact input methods as they can reduce the number of physical interactions between the user and the apparatus.

In some implementations, detecting the confirmation signal comprises: detecting a contact-required input provided by a contact-required input device 234 such as physical input device.

In some implementations, detecting the confirmation signal comprises detecting an audio input provided by an audio sensing device. The provision of an audio sensing device may be particularly advantageous in non-contact input methods as it reduces the number of physical interactions between the user and the apparatus. Furthermore, combining eye-tracking technology and audio sensing technology may be perceived by some users as improving the ergonomics of the user-apparatus interaction even further. While this disclosure focuses on the combination of gaze-based control with scanning-based control for controlling an apparatus, the reader will appreciate that the audio sensing can alternatively be combined exclusively with gaze-based control or exclusively with scanning-based control.

Figure 5C:
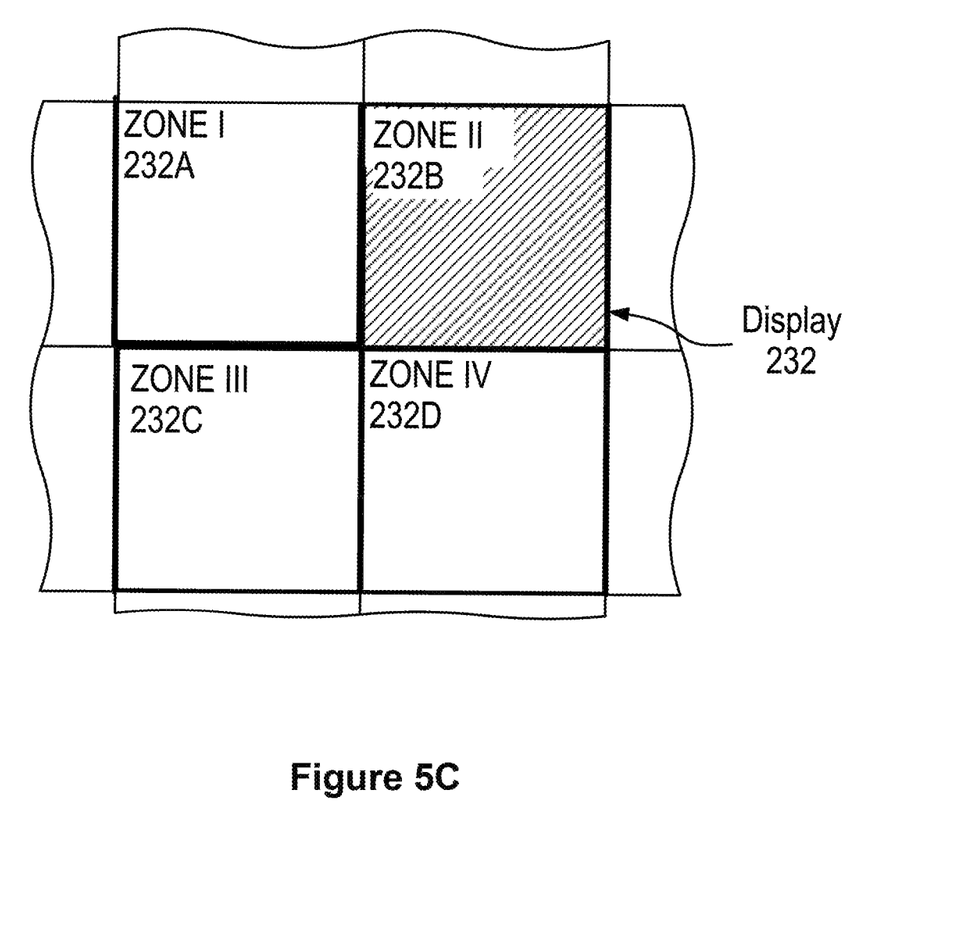

FIG. 5C illustrates a sequence of the user-apparatus interaction when a zone, i.e. Zone II 232B in this example, has been selected, e.g. in response to the apparatus detecting a confirmation signal as described above. In this example, the apparatus 200 is operative to output visual feedback (here exemplified by presenting a visual appearance of Zone II 232B which differs from the visual appearance of unselected zones 232A (Zone I), 232C (Zone III) and 232D (Zone IV)) to guide a user in the user's interaction process with the apparatus 200. Additionally, or alternatively, the apparatus may be operative to output auditory feedback via an audio output device (not shown) for guiding the user in the user's interaction process with the apparatus 200.

Figure 5D:
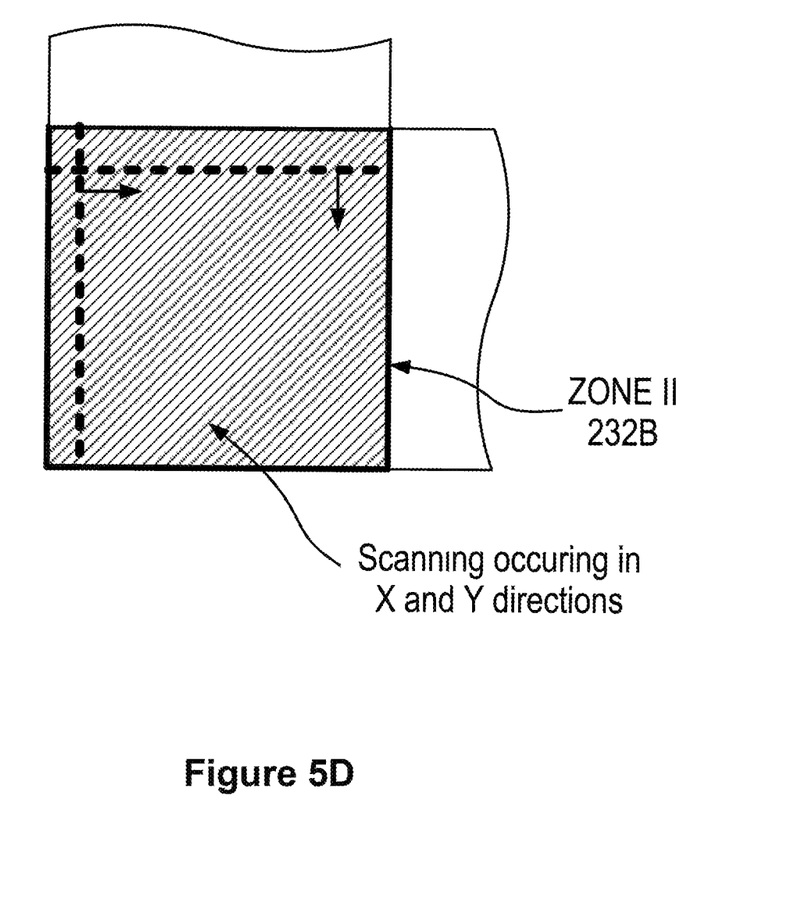

Reference is now made to FIG. 5D, which illustrates an enlarged view of a selected zone, i.e. Zone II 232B in this example. Once this zone is selected, scanning control may be performed in this zone only. The scanning control is performed in X and Y directions. In contrast to the existing art, where the whole display area of the display 232 is typically scanned, scanning control is only performed within a sub-area of the display (i.e., the zone (e.g. Zone II 232B in this example) that has been selected using the gaze-based control).

The user-apparatus interaction when a user interacts with the apparatus 200 shown in FIG. 4 and FIGS. 5A-5C is advantageous in that it allows for an improvement upon existing methods and apparatuses for controlling the apparatus 200. An important contribution to the existing art is based on the realization that it is advantageous to combine gaze-based control with scanning-based control for controlling an apparatus. In the existing art, these two control methods have always been used as separate input methods. By combining gaze-based control with scanning-based control for controlling an apparatus, some embodiments may allow for reducing the number of physical interactions between the user and the apparatus. This, in turn, may improve the overall speed in operating the apparatus during the user-apparatus interaction. Furthermore, the fewer the number of the physical interactions are the better can the ergonomics be. This may be particularly important to some users, e.g. users having disabilities. This can reduce these users' fatigue in arms and hand during their interaction with the apparatus.

Figure 6:
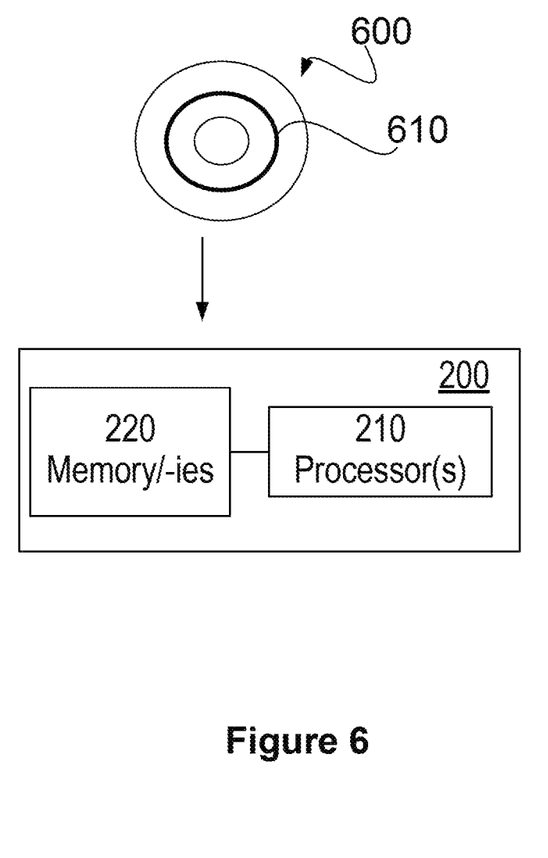
FIG. 6 illustrates a carrier containing a computer program, in accordance with an embodiment.

Turning now to FIG. 6, another embodiment will be briefly discussed. FIG. 6 shows an example of a computer-readable medium, in this example in the form of a data disc 600. In one embodiment the data disc 600 is a magnetic data storage disc. The data disc 600 is configured to carry instructions 610 that can be loaded into one or more memories 220 of an apparatus 200. Upon execution of said instructions by one or more processors 210 of the apparatus 200, the apparatus 200 is caused to execute a method or procedure according to any one of the embodiments disclosed in this disclosure. The data disc 600 is arranged to be connected to or within and read by a reading device (not shown), for loading the instructions into the processor(s). One such example of a reading device in combination with one (or several) data disc(s) 600 is a hard drive. It should be noted that the computer-readable medium can also be other mediums such as compact discs, digital video discs, flash memories or other memory technologies commonly used. In such an embodiment the data disc 600 is one type of a tangible computer-readable medium. The instructions may alternatively be downloaded to a computer data reading device, such as a computer or other apparatus 200 capable of reading computer coded data on a computer-readable medium, by comprising the instructions in a computer-readable signal (not shown) which is transmitted via a wireless (or wired) interface (for example via the Internet) to the computer data reading device for loading the instructions into one or more processors 210 of the apparatus 200. In such an embodiment, the computer-readable signal is one type of a non-tangible computer-readable medium.

In the detailed description hereinabove, for purposes of explanation and not limitation, specific details are set forth in order to provide a thorough understanding of various embodiments described in this disclosure. In some instances, detailed descriptions of well-known devices, components, circuits, and methods have been omitted so as not to obscure the description of the embodiments disclosed herein with unnecessary detail. All statements herein reciting principles, aspects, and embodiments disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated that block diagrams herein can represent conceptual views of illustrative circuitry or other functional units embodying the principles of the described embodiments. Similarly, it will be appreciated that any flow charts and the like represent various processes which may be substantially represented in computer readable medium and so executed by a computer or processor, whether or not such computer or processor is explicitly shown. The functions of the various elements including functional blocks, may be provided through the use of hardware such as circuit hardware and/or hardware capable of executing software in the form of coded instructions stored on the above-mentioned computer readable medium. Thus, such functions and illustrated functional blocks are to be understood as being either hardware-implemented and/or computer-implemented, and thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions. In terms of computer implementation, a computer is generally understood to comprise one or more processors or one or more controllers. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" may also be construed to refer to other hardware capable of performing such functions and/or executing software, such as the example hardware recited above.

Modifications and other variants of the described embodiments will come to mind to one skilled in the art having benefit of the teachings presented in the foregoing description and associated drawings. Therefore, it is to be understood that the embodiments are not limited to the specific example embodiments described in this disclosure and that modifications and other variants are intended to be included within the scope of this disclosure. Furthermore, although specific terms may be employed herein, they are used in a generic and descriptive sense only and not for purposes of limitation. Therefore, a person skilled in the art would recognize numerous variations to the described embodiments that would still fall within the scope of the appended claims. For example, it should be appreciated that the technology described herein can be applied in various applications. As one mere example, the apparatus described herein may alternatively be embodied as a computerized display panel. The computerized display panel may be a display panel for use in car, a truck, a boat or in similar movable object or, alternatively a display panel in a building, e.g. a display panel on home appliance, a refrigerator, etc. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality.

The invention claimed is:

1. A method of controlling an apparatus having a display, wherein the method combines gaze-based control with scanning-based control for controlling the apparatus, the method comprising:
presenting a graphical representation of a plurality of zones via the display of the apparatus, wherein the display is divided into the plurality of zones;
performing gaze-based control, wherein performing gaze-based control comprises:
receiving, from an eye-tracking device, an input from a user representing a point of a gaze of the user;
identifying a gaze target location on the display based on the input from the user, wherein identifying the gaze target location further comprises:
outputting auditory feedback to guide the user in an interaction process of the user with the apparatus; and
detecting a confirmation signal based on information provided by the apparatus by detecting a blink based on information provided by the eye-tracking device; and
selecting, from the plurality of zones presented via the display of the apparatus, a zone based on the identified gaze target location, wherein the zone is selected only in response to detecting the confirmation signal; and
in response to selecting the zone, performing scanning-based control only within the selected zone by scanning the selected zone presented via the display of the apparatus in an x-direction and a y-direction.

2. The method of claim 1, further comprising performing the scanning-based control prior to receiving the input representing the point of the gaze of the user, wherein the input representing the point of the gaze of the user is received during the scanning-based control.

3. An apparatus configured to combine gaze-based control with scanning-based control for controlling the apparatus, the apparatus comprising:
an eye-tracking device;
a display;
a processor; and
a memory comprising instructions executable by the processor whereby the apparatus is operative to:
present a graphical representation of a plurality of zones via the display of the apparatus, wherein the display is divided into the plurality of zones;
perform gaze-based control, wherein when performing gaze-based control, the apparatus is operative to:
receive, from the eye-tracking device, an input from a user representing a point of a gaze of the user;
identify a gaze target location on the display based on the input from the user, wherein, when identifying the gaze target location the apparatus is operative to:
output auditory feedback to guide the user in an interaction process of the user with the apparatus; and
detect a confirmation signal based on information provided by the apparatus, wherein detecting the confirmation signal comprises detecting a blink based on information provided by the eye-tracking device; and
select, from the plurality of zones presented via the display of the apparatus, a zone based on the identified gaze target location, wherein the zone is selected only in response to detecting the confirmation signal; and
in response to selecting the zone, perform scanning-based control only within the selected zone by scanning the selected zone presented via the display of the apparatus in an x-direction and a y-direction.

4. The apparatus of claim 3, wherein the memory comprises instructions executable by the processor whereby the apparatus is operative to perform the scanning-based control prior to receiving an input representing the point of the gaze of the user and wherein the input representing the point of the gaze of the user is received during the scanning-based control.

5. The apparatus of claim 3, wherein the memory comprises instructions executable by the processor whereby the apparatus is operative to detect a gaze target fixating at the gaze target location for a predetermined length of time.

6. The apparatus of claim 3, wherein the memory comprises instructions executable by the processor whereby the apparatus is operative to detect a blink based on information provided by the eye-tracking device.

7. The apparatus of claim 3, wherein the memory comprises instructions executable by the processor whereby the apparatus is operative to detect a saccade based on information provided by the eye-tracking device.

8. The apparatus of claim 3, further comprising a physical input device and wherein the memory comprises instructions executable by the processor whereby the apparatus is operative to detect a contact-required input provided by the physical input device.

9. The apparatus of claim 3, wherein the memory comprises instructions executable by the processor whereby the apparatus is operative to detecting an audio input provided by an audio sensing device.

10. The apparatus of claim 3, wherein the memory comprises instructions executable by the processor whereby the apparatus is operative to select the zone only in response to detecting the confirmation signal.

11. The apparatus of claim 3, wherein the memory comprises instructions executable by the processor whereby the apparatus is operative to present a graphical representation of the plurality of zones on the display to guide a user in an interaction process of the user with the apparatus by making selectable zones viewable on the display.

12. The apparatus of claim 3, wherein the apparatus is an apparatus selected from the group consisting of: a computer, a tablet computer, and a desktop computer.

13. A non-transitory computer-readable storage medium comprising computer-readable instructions stored thereon which, when executed by at least one processor, cause the at least one processor to perform operations comprising:
   presenting a graphical representation of a plurality of zones via a display of an apparatus, wherein the display is divided into the plurality of zones;
   performing gaze-based control, wherein when performing gaze-based control, the instructions case the at least one processor to perform operations comprising:
      receiving, from an eye-tracking device, an input from a user representing a point of a gaze of the user;
      identifying a gaze target location on the display based on the input from the user, wherein when identifying the gaze target location, the instructions further case the at least one processor to perform operations comprising:
      outputting auditory feedback to guide the user in an interaction process of the user with the apparatus; and
      detecting a confirmation signal based on information provided by the apparatus, wherein detecting the confirmation signal comprises detecting a blink based on information provided by the eye-tracking device; and
      selecting, from the plurality of zones presented via the display of the apparatus, a zone based on the identified gaze target location, wherein the zone is selected only in response to detecting the confirmation signal; and
   in response to selecting the zone, performing scanning-based control only within the selected zone by scanning the selected zone presented via the display of the apparatus in an x-direction and a y-direction.

14. The non-transitory computer-readable storage medium of claim 13, the operations further comprising performing the scanning-based control prior to receiving the input representing the point of the gaze of the user, wherein the input representing the point of the gaze of the user is received during the scanning-based control.

15. The method of claim 1, wherein detecting the confirmation signal comprises: detecting a gaze target location for a predetermined length of time.

16. The method of claim 1, wherein detecting the confirmation signal comprises: detecting a contact-required input provided by a physical input device.

17. The method of claim 1, wherein detecting the confirmation signal comprises: detecting an audio input provided by an audio sensing device.

* * * * *